US012589868B2

(12) United States Patent
Halcom et al.

(10) Patent No.: US 12,589,868 B2
(45) Date of Patent: Mar. 31, 2026

(54) BLADE POSITION CONTROL SYSTEM

(71) Applicant: Textron Innovations Inc., Providence, RI (US)

(72) Inventors: Lancer Drake Halcom, Coppell, TX (US); Kyle Thomas Cravener, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 73 days.

(21) Appl. No.: 18/472,933

(22) Filed: Sep. 22, 2023

(65) Prior Publication Data

US 2025/0100680 A1     Mar. 27, 2025

(51) Int. Cl.
B64C 27/72 (2006.01)
B64C 27/50 (2006.01)

(52) U.S. Cl.
CPC .............. B64C 27/72 (2013.01); B64C 27/50 (2013.01)

(58) Field of Classification Search
CPC ..... B64C 29/0033; B64C 27/72; B64C 27/50; B64C 11/28; B64C 3/56
See application file for complete search history.

(56) References Cited

U.S. PATENT DOCUMENTS

| | | | | | |
|---|---|---|---|---|---|
| 3,153,455 | A | * | 10/1964 | Mosinskis ............... | B64C 27/50 |
| | | | | | 416/142 |
| 3,438,447 | A | * | 4/1969 | Ferris ...................... | B64C 27/50 |
| | | | | | 74/665 N |
| 10,336,447 | B2 | * | 7/2019 | Tzeng ..................... | B64C 11/28 |
| 10,773,798 | B2 | * | 9/2020 | Haldeman ............... | B64C 27/48 |
| 10,858,096 | B1 | * | 12/2020 | Schmaling ............. | B64C 27/50 |
| 10,933,986 | B2 | * | 3/2021 | Paulson .................. | B64C 27/50 |
| 2015/0274290 | A1 | * | 10/2015 | Fenny ..................... | B64C 27/30 |
| | | | | | 244/17.25 |
| 2016/0152329 | A1 | * | 6/2016 | Tzeng ..................... | B64C 11/28 |
| | | | | | 29/889.1 |
| 2017/0144746 | A1 | * | 5/2017 | Schank .................. | B64D 27/20 |
| 2021/0139157 | A1 | * | 5/2021 | Thompson .............. | B64C 27/32 |

* cited by examiner

*Primary Examiner* — Courtney D Heinle
*Assistant Examiner* — Andrew Thanh Bui
(74) *Attorney, Agent, or Firm* — Lightfoot & Alford PLLC

(57)     ABSTRACT

An aircraft that has a blade position control system (BPCS). The BPCS includes an actuator, a multilobe component configured for at least one of longitudinal movement along a mast axis as a function of actuation of the actuator and rotational movement relative to the mast axis as a function of actuation of the actuator. Movement of the multilobe component selectively restricts at least one of pitch movement and folding of a plurality of rotor blades.

17 Claims, 12 Drawing Sheets

314

BLADE POSITION CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Fixed-wing aircraft, such as airplanes, are capable of flight using wings that generate lift in response to the forward airspeed of the aircraft. The forward airspeed is generated by thrust from one or more jet engines or propellers. The wings generally have an airfoil cross section that generates lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering, and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas. Helicopters, however, typically lack the forward airspeed of fixed-wing aircraft.

Tiltrotor aircraft overcome this drawback by including a set of proprotors that can change their plane of rotation based on the operation being performed. Tiltrotor aircraft generate lift and propulsion using proprotors that are typically mounted near the ends of a fixed wing. The proprotors are pivotable relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

Tiltrotor aircraft are hybrids between traditional helicopters and traditional propeller driven airplanes. During airplane mode of the tiltrotor, forward speed and range is limited by certain fundamental limitations of the rotor systems.

Some tiltrotor aircraft are further configured to increase forward speed and range by selectively folding rotor blades during airplane mode and using turbofan engines for thrust. However, conventional rotor blade folding mechanisms require actuation and locking systems for folding the rotor blades having an excessive number of components and the components are disposed undesirably far from a mast axis so that undesirable forces are generated when the components are rotated about the mast axis at high speeds.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges mechanisms for controlling the ability of rotor blades to pivot about a pitch axis and a folding axis, thereby allowing transitioning a tiltrotor aircraft between rotary and non-rotary flight modes.

Figure 1A:
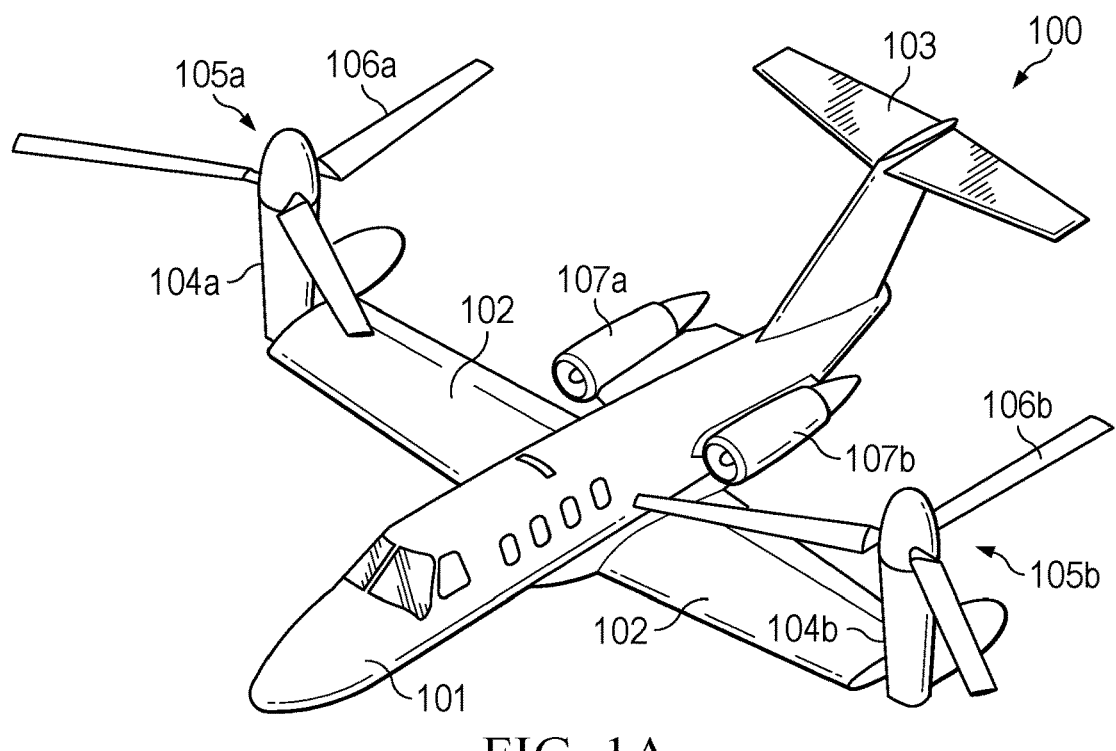
FIGS. 1A-1C illustrate a tiltrotor aircraft in various rotary and non-rotary flight modes.
Figure 1B:
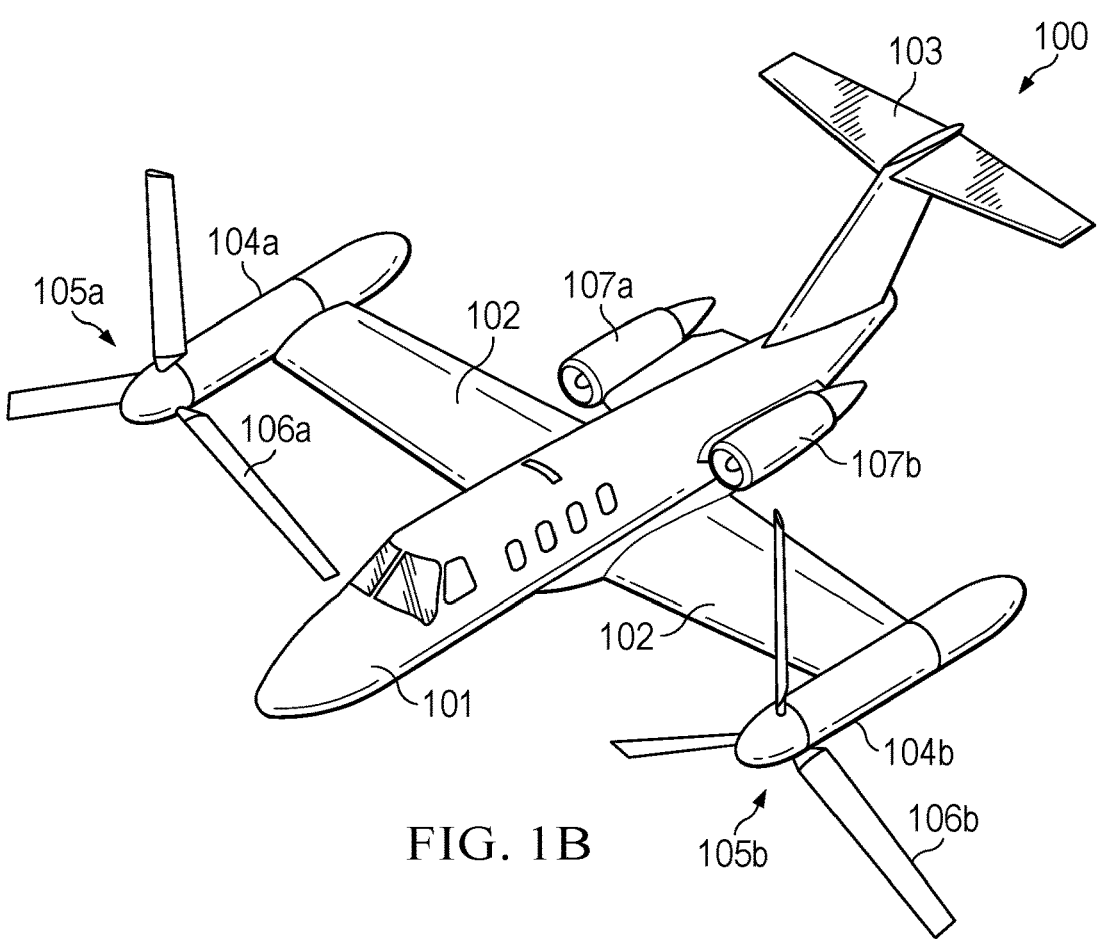
Figure 1C:
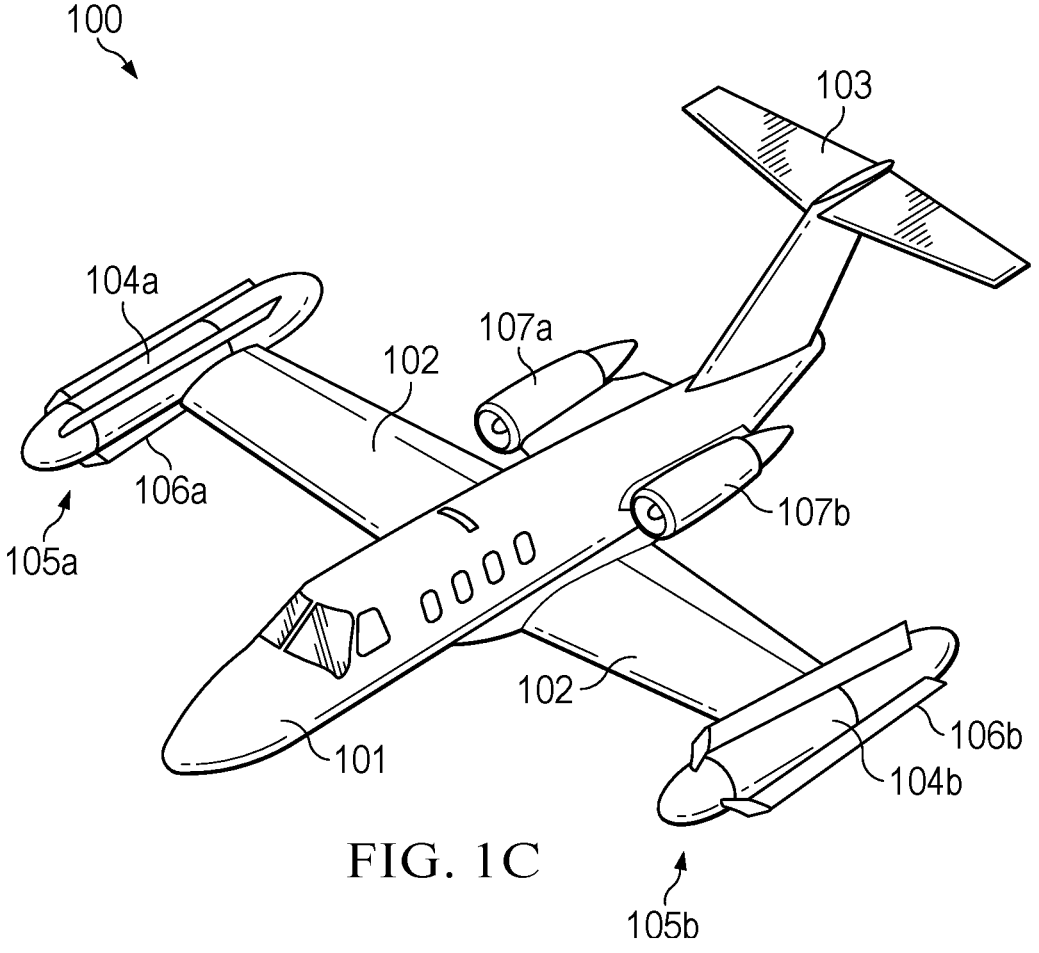
Figure 2:
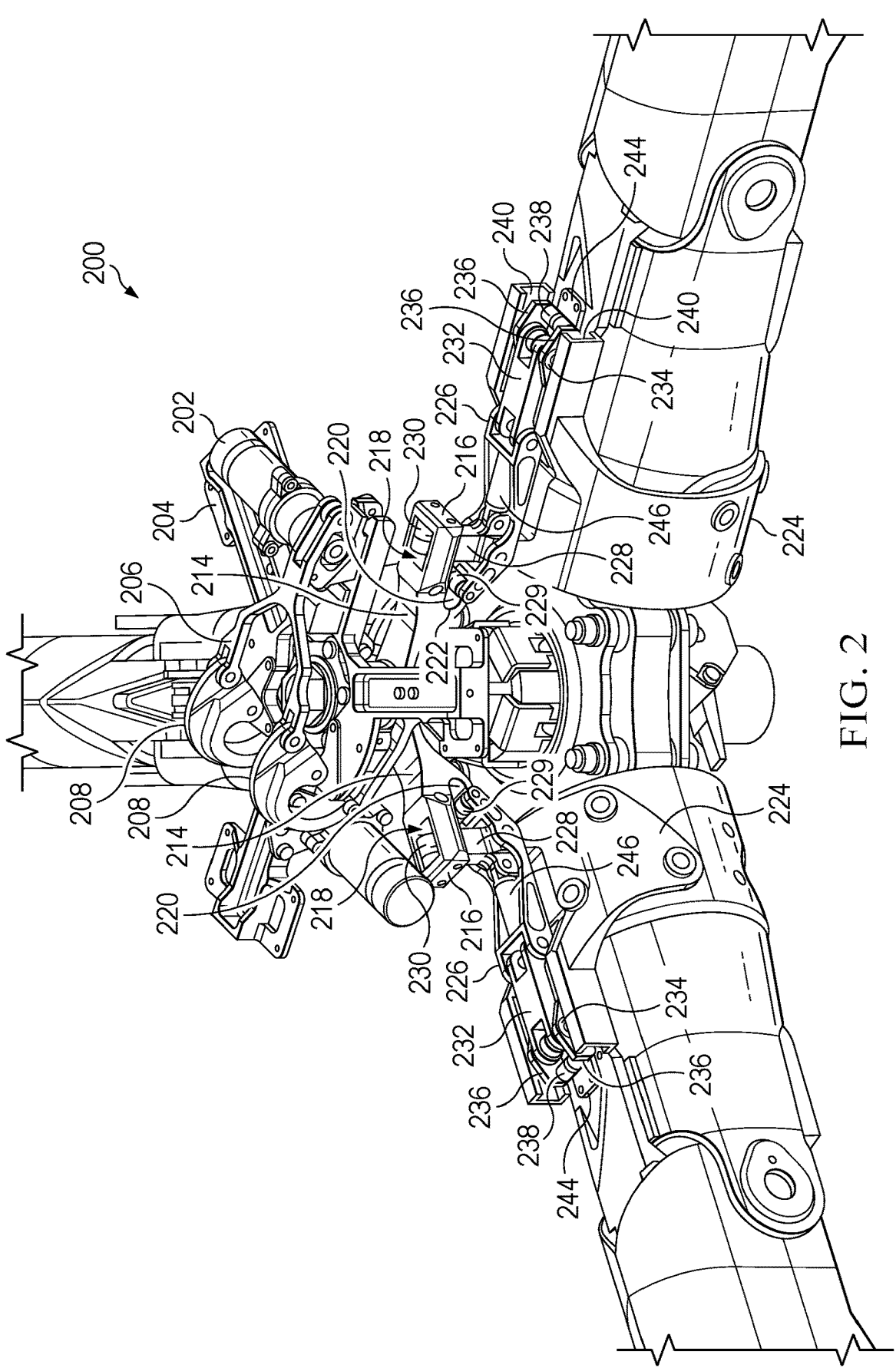
FIG. 2 is an oblique view of a blade position control system (BPCS) in an intermediate state according to an embodiment of this disclosure.

Referring to FIGS. 1A-1C, a tiltrotor aircraft is schematically illustrated and generally designated 100. Tiltrotor aircraft 100 includes a fuselage 101, wings 102 and tail assembly 103. Wings 102 and tail assembly 103 may include control surfaces, such as ailerons, flaps, slats, spoilers, elevators, rudders, or ruddervators. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1C. Pylon assemblies 104a, 104b may comprise a fixed portion that is attached to wing 102 and a moveable portion that rotates or pivots relative to wing 102 as illustrated in FIG. 1A. In other embodiments, the entire pylon assembly 104a, 104b may rotate relative to wing 102.

Pylon assemblies 104a, 104b each house a portion of a drive system that is used to rotate proprotor assemblies 105a, 105b, respectively. The drive system may comprise, for example, a lift engine within fuselage 101 that is coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded. In other embodiments, pylon assemblies 104a, 104b may comprise engines that are configured to drive respective proprotor assemblies 105a, 105b.

FIG. 1A illustrates tiltrotor aircraft 100 in VTOL or helicopter flight mode, in which pylons 104a, 104b are configured in a vertical position and proprotor blades 106a, 106b rotate in a substantially horizontal plane to provide a lifting thrust, such that tiltrotor aircraft 100 flies much like a conventional helicopter.

FIG. 1B illustrates tiltrotor aircraft 100 in a forward flight mode, in which pylons 104a, 104b have been rotated forward to a horizontal position so that proprotor blades 106a, 106b are rotating in a substantially vertical plane to provide a forward thrust, thereby enabling wings 102 to provide a lifting force responsive to forward airspeed, such that tiltrotor aircraft 100 flies much like a conventional propeller driven airplane.

In the rotary flight modes, proprotor assemblies 105a, 105b rotate in opposite directions to provide torque balancing to tiltrotor aircraft 100. For example, when viewed from the front of tiltrotor aircraft 100 in proprotor forward flight mode (FIG. 1B) or from the top in helicopter mode (FIG. 1A), proprotor assembly 105a may rotate clockwise, for example, and proprotor assembly 105b may rotate counterclockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that tiltrotor aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, tiltrotor aircraft 100 may transition between a proprotor-driven forward-flight mode and a thrust-driven forward-flight mode (referred to herein as "jet mode"). The thrust engine may be, for example, turbojet engines 107a, 107b that are mounted on fuselage 101. The thrust engine may be engaged to initially supplement the forward thrust of proprotor assemblies 105a, 105b. The lift engine may then be disengaged from proprotor assemblies 105a, 105b so that the thrust engines 107a, 107b provide all of the forward thrust for tiltrotor aircraft 100. The proprotor blades 106a, 106b on proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates tiltrotor aircraft 100 in a jet mode, in which proprotor blades 106a, 106b have been folded so that they are oriented substantially parallel to respective pylon assemblies 104a, 104b. This configuration minimizes the drag force generated by proprotor blades 106a, 106b during jet-mode flight. The forward cruising speed of tiltrotor aircraft 100 can be significantly higher in a thrust-driven airplane flight mode versus proprotor flight mode by reducing any airspeed-induced proprotor aeroelastic instability. In this configuration, the thrust engines 107a, 107b provide forward thrust for tiltrotor aircraft 100, thereby enabling wings 102 to provide a lifting force responsive to the forward airspeed. Apparatus for folding rotor blades on a stop-fold aircraft are disclosed, for example, in U.S. Pat. Nos. 8,998,125 B2, 10,336,447 B2, 10,526,068 B2, 11,511, 848 B2, and U.S. Pat. App. Pub. 2023/0101186 A1, the disclosures of which are hereby incorporated herein by reference in their entirety.

Tiltrotor aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the lift engine may again engage proprotor assemblies 105a, 105b. When torque power is applied to rotate proprotor blades 106a, 106b, tiltrotor aircraft 100 enters proprotor forward-flight mode. Tiltrotor aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

A flight control computer (FCC) may be incorporated into tiltrotor aircraft 100 and may be configured to control and communicate with various systems including, for example, proprotor blade control systems in proprotor assembly 105a, 105b. The proprotor blade control systems may be communicably coupled to the FCC and may provide closed-loop control of controllable elements located within the proprotor assemblies 105a, 105b. The controllable elements within the proprotor assemblies 105a, 105b may include any structural feature operable to move and/or effect change such as, for example, blade locks, a gimbal lock, trailing-edge flaps, twistable blades, independently controllable elements attached or connected to blades, combinations of the foregoing and/or the like.

The proprotor blade control systems may include, for example, actuators that control motion of the controllable elements in the proprotor assemblies 105a, 105b, sensors that provide position feedback data related to the controllable elements, and control computers that operate the actuators, for example, by transmitting control signals to the actuators. The FCC and the proprotor blade control systems may collaboratively provide a variety of redundant control methods relative to the controllable elements in the proprotor assemblies 105a, 105b.

Although tiltrotor aircraft 100 has been described as having an internal lift engine and separate external thrust engines 107a, 107b, wherein the lift engine may operate both of the proprotor assemblies in rotary flight mode, it should be understood by those having ordinary skill in the art that other engine arrangements are possible and are considered to be within the scope of the present disclosure. For example, in an alternative embodiment, tiltrotor aircraft 100 may have multiple lift engines that provide torque and rotational energy separately to proprotor assemblies 105a, 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations. In other embodiments, the thrust engines 107a, 107b may be located inside fuselage 101 or on wings 102. In further embodiments, the same engine(s) may provide both lifting and thrust power, such as an engine with turboshaft, turbofan, and/or turboprop capabilities.

Most generally, this disclosure divulges blade position control systems (BPCSs) configured to selectively transition proprotor systems, such as, but not limited to proprotor systems 105a, 105b between first and second operational states. In a first operational state, blades such as, but not limited to blades 106a, 106b, are locked in an unfolded state and free to rotate about a pitch axis (see FIGS. 1A and 1B). In a second operational state, blades 106a, 106b are in an unlocked state to allow folding and are locked and prevented from rotating about a pitch axis (see FIG. 1C). As described herein, when the BPCSs are fully disengaged, the blades are locked in an unfolded position and the blades are free to rotate about a pitch axis. When the BPCSs are fully engaged, the blades are allowed to fold and the blades are locked to prevent rotation about a pitch axis. In the embodiments disclosed, BPCSs can provide an intermediate state in which the blades are locked to prevent rotation about a pitch axis while the blades remain locked in the unfolded state.

Referring now to FIGS. 2-6, BPCS 200 comprises an actuator 202 carried by a spinner 204. The actuator 202 is rotatably connected to a wishbone link 206 that is rotatably connected to two curved arms 208 which themselves are rotatably mounted to the spinner 204. Each curved arm 208 is rotatably connected to a multilobe component 210 via component links 212. In operation, actuation of the actuator 202 can move wishbone link 206 in a manner that causes rotation of the curved arms 208 about their connection to the spinner 204. Rotation of the curved arms 208 can cause displacement of the component links 212 along a mast axis. Accordingly, multilobe component 210 can be selectively translated along the mast axis as a result of actuation of the actuator 202.

In this embodiment, multilobe component 210 comprises three arms 214, each comprising a receiver 216 comprising an aperture 218 open in a direction parallel to the mast axis. Further, each arm 214 comprises a hook guide 220 comprising a concave profile 222 open in a direction generally orthogonal relative to the mast axis. The receiver 216 and aperture 218 are associated with selectively restricting movement of the blades about the associated blade pitch axes. The hook guide 220 and profile 222 are associated with selectively controlling locking the blades in extended positions and unlocking the blades to allow folding of the blades.

BPCS 200 further comprises a cuff 224 configured to carry an activation arm 226 that is rotatably connected to the cuff 224. Activation arm 226 carries a rotatably connected activation roller 229 that is configured to be selectively received within the concavity formed by the profile 222. Cuff 224 also carries a pitch lock tab 228 that extends along the mast axis toward the spinner 204. Pitch lock tab 228 is configured to be selectively received within aperture 218, thereby selectively preventing rotation of the cuff 224 and associated blade about the pitch axis of the blade. In this embodiment, a pitch lock roller 230 is carried within aperture 218 to selectively engage against pitch lock tab 228 when pitch lock tab 228 is received within aperture 218.

Cuff 224 additionally carries a slider arm 232 that is rotatable connected to activation arm 226. Slider arm 232 is also rotatably connected to a pin 234 that extends through slider arm 232 and roller plates 236 that carry track rollers 238. Track rollers 238 extend laterally and into opposing tracks 240 of cuff 224 so that movement of track rollers 238 is substantially restricted to longitudinal movement along a length of opposing tracks 240.

Figure 4:
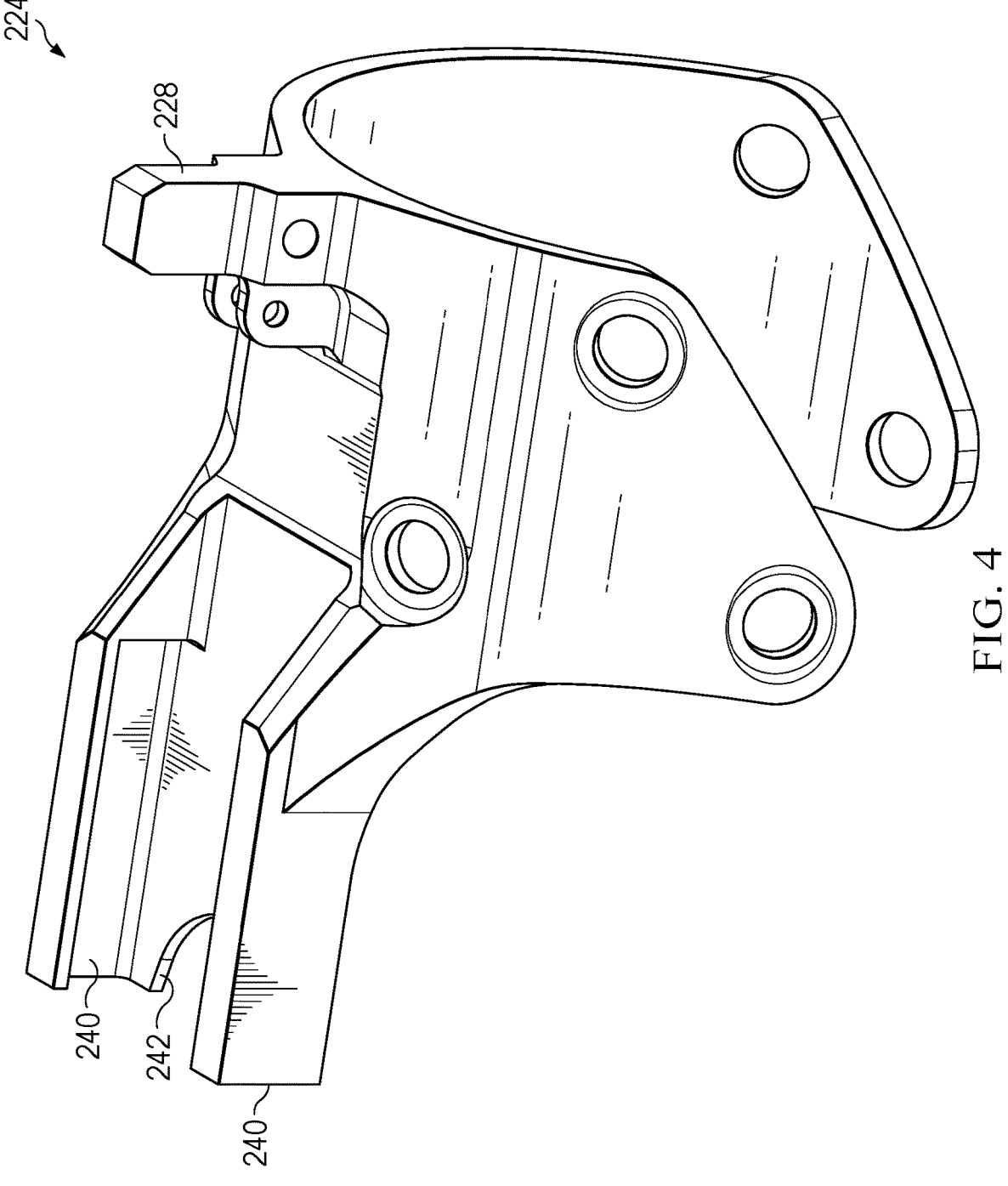
FIG. 4 is an oblique view of a cuff of the BPCS of FIG. 2.

Referring now to FIG. 4, cuff 224 comprises a pad notch 242 configured to selectively receive a stabilization pad 244 carried by the blade. When the blade is locked in an extended position, stabilization pad 244 is received within pad notch 242 and stabilization pad 244 is captured and compressed between the blade grip and track roller 238 to selectively stiffen the blade assembly while the blade is in the extended position.

Figure 3:
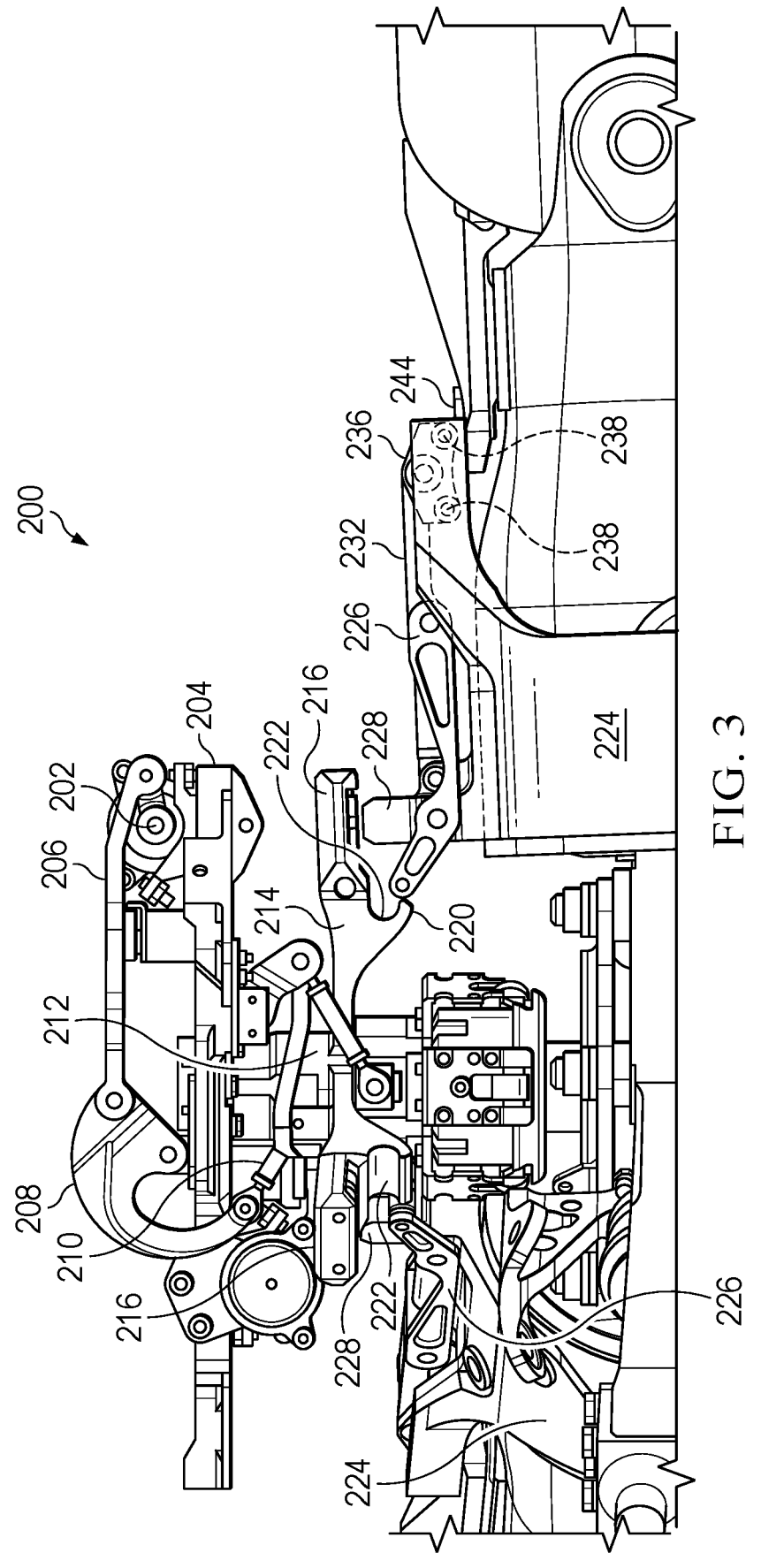
FIG. 3 is a side view of the BPCS of FIG. 2 in a disengaged state.
Figure 5:
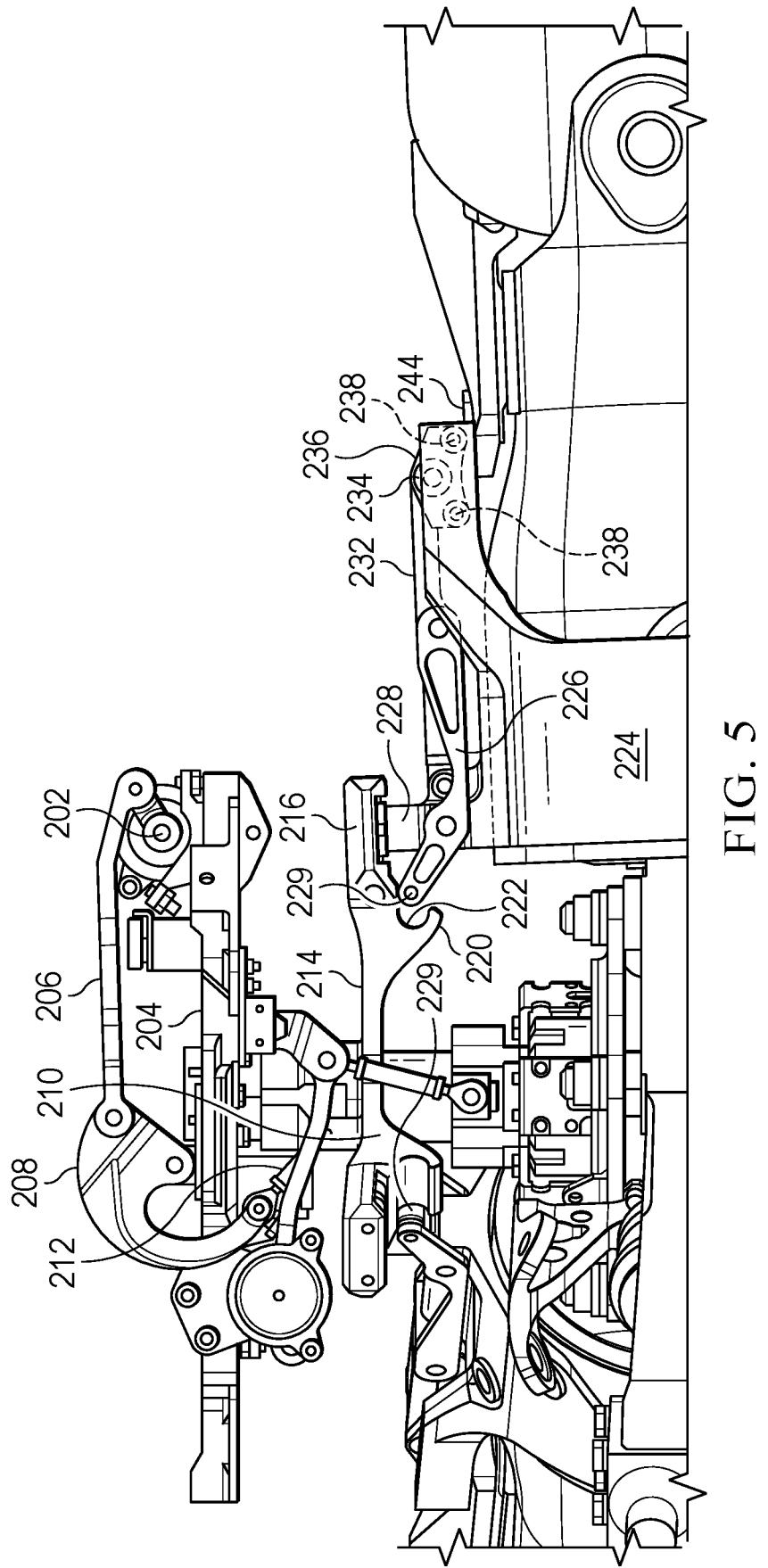
FIG. 5 is a side view of the BPCS of FIG. 2 in an intermediate state.
Figure 6:
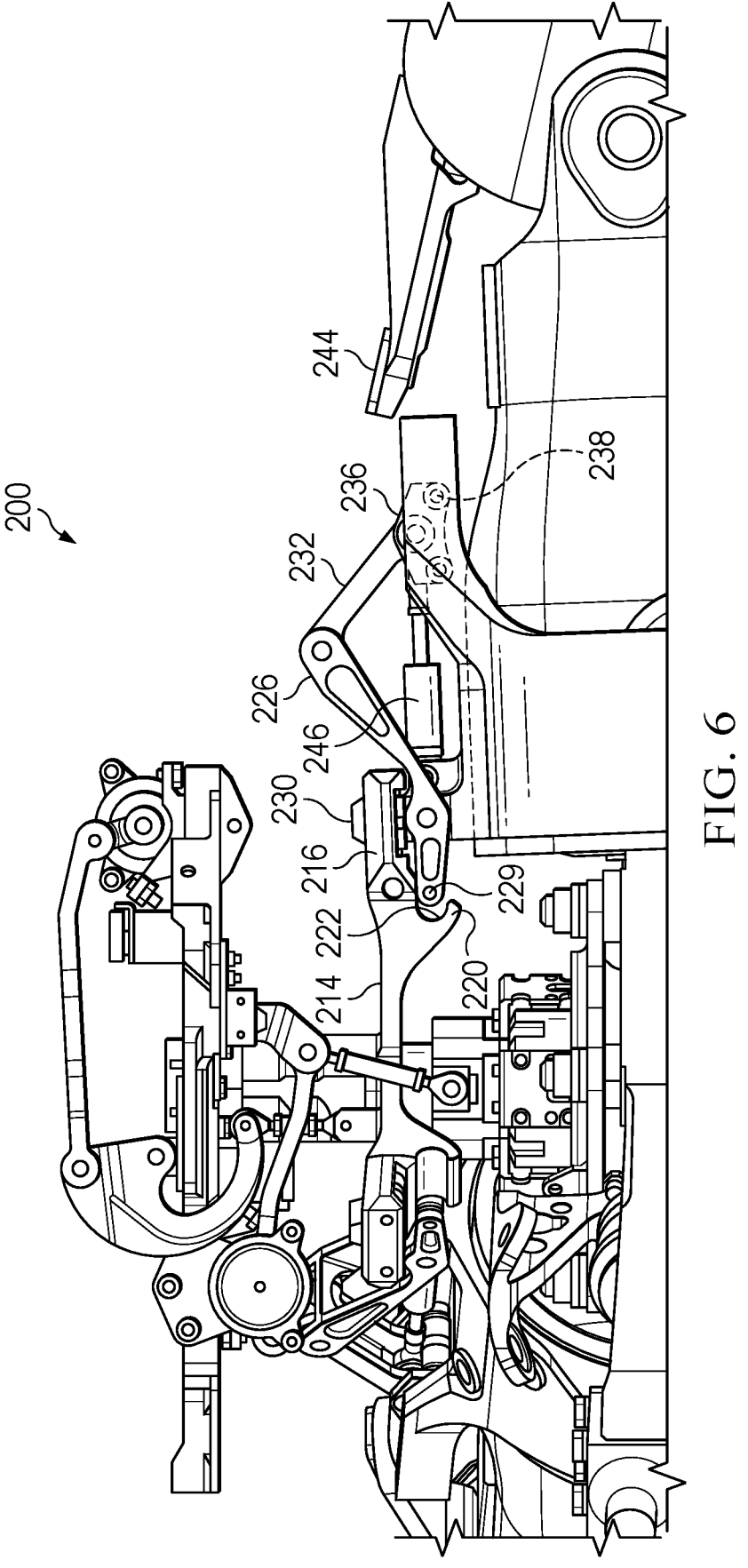
FIG. 6 is a side view of the BPCS of FIG. 2 in an engaged state.
Figure 7:
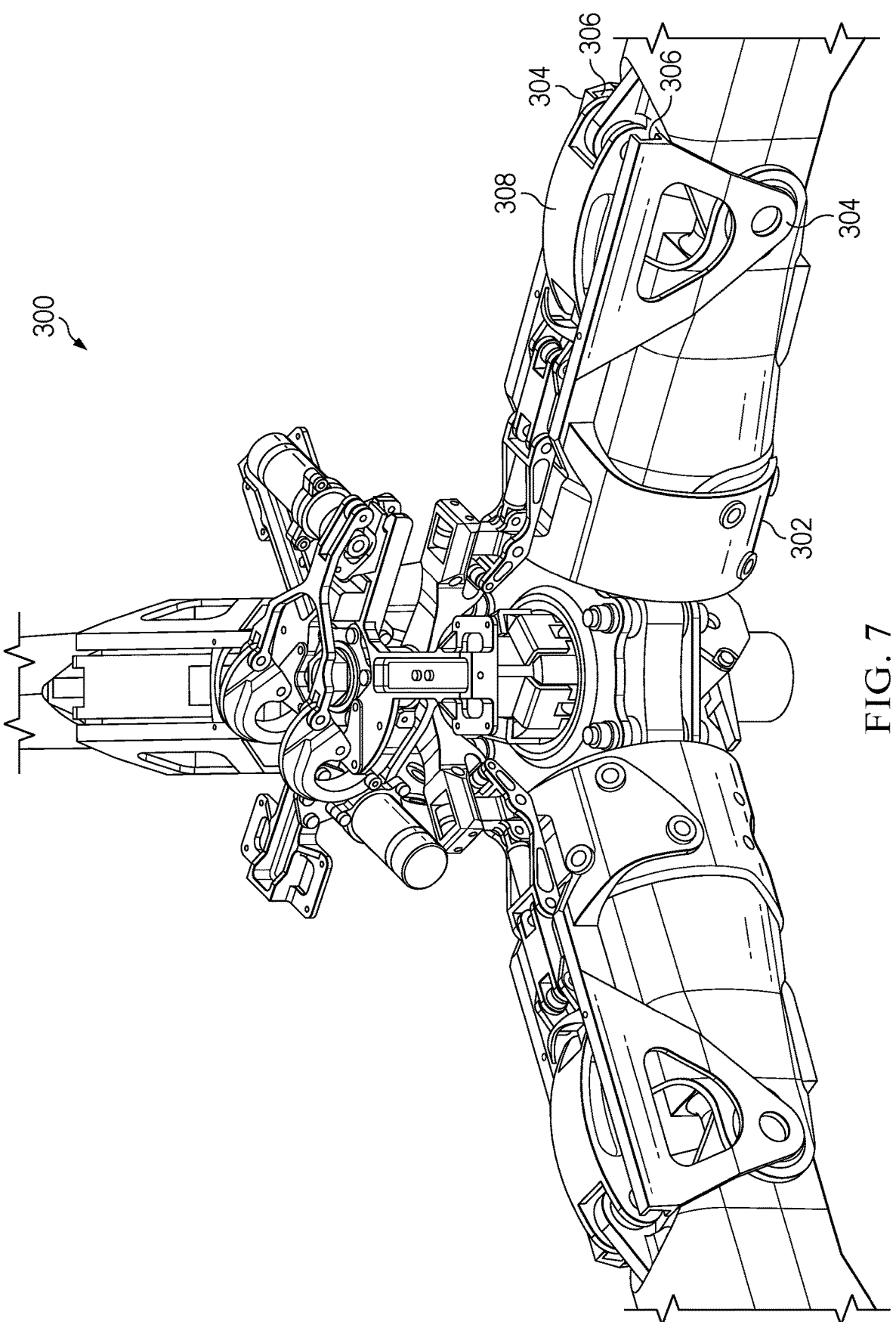
FIG. 7 is an oblique view of another embodiment of a BPCS in an intermediate or a disengaged state according to an embodiment of this disclosure.

In operation, to transition the BPCS 200 from the fully disengaged state shown in FIG. 3 to the fully engaged state shown in FIG. 6, actuator 202 can be actuated to move wishbone link 206, thereby rotating curved arms 208, thereby displacing component links 212, thereby moving multilobe component 210 along the mast axis relative to spinner 204. After sufficient displacement of multilobe component 210 toward cuff 224, at least a portion of pitch lock tab 228 can be received within aperture 218 and force fit between multilobe component 210 and pitch lock roller 230, thereby preventing rotation of the cuff 224 and blade about the pitch axis of the blade. When the pitch lock tab 228 is initially received within aperture 218, activation roller 229 remains external to the concavity formed by profile 222 of hook guide 220 as shown in FIG. 5. In alternative embodiments, a hook guide can be hingeable, plungeable, or shimmed into place. However, with further displacement of multilobe component 210 toward cuff 224, activation roller 229 enters the concavity and contacts profile 222. As multilobe component 210 is further progressed along the mast axis, activation roller 229 causes rotation of activation arm 226 relative to cuff 224 thereby causing retraction of slider arm 232 toward the mast axis. With sufficient movement of slider arm 232 along tracks 240, track rollers 238 are retracted away from the blade and away from pad notch 242 so that track rollers 238 no longer press to hold the blade in the extended position. Accordingly, with sufficient movement of multilobe component 210, the blade can be both locked to prevent pitch rotation about the pitch axis and to allow folding of blades. In this embodiment, a biasing device 246 (such as a charged gas spring) can be used to bias the slider arm 232 away from the mast axis.

BPCS 200 provides a mechanism for selectively locking and unlocking pitch movement of a blade and selectively locking/unlocking folding of a blade in an extended configuration using as few as a single linkage path. BPCS 200 allows such blade control of multiple blades (in this embodiment three blades) using a single shared mechanism as opposed to requiring multiple actuators and/or separate linkage paths and/or sets of actuation components unique to each blade. Further, the components of BPCS 200 are comparatively more centrally located near the mast axis as compared to conventional solutions to pitch lock and blade fold locking. BPCS 200 also allows blade tracking and blade tip sweep adjustments without tying the two inherently together. Still further, BPCS 200 eliminates some complexities related to over-centering spring links, adjustable fold crank arms and drag braces like some conventional solutions.

Figure 8:
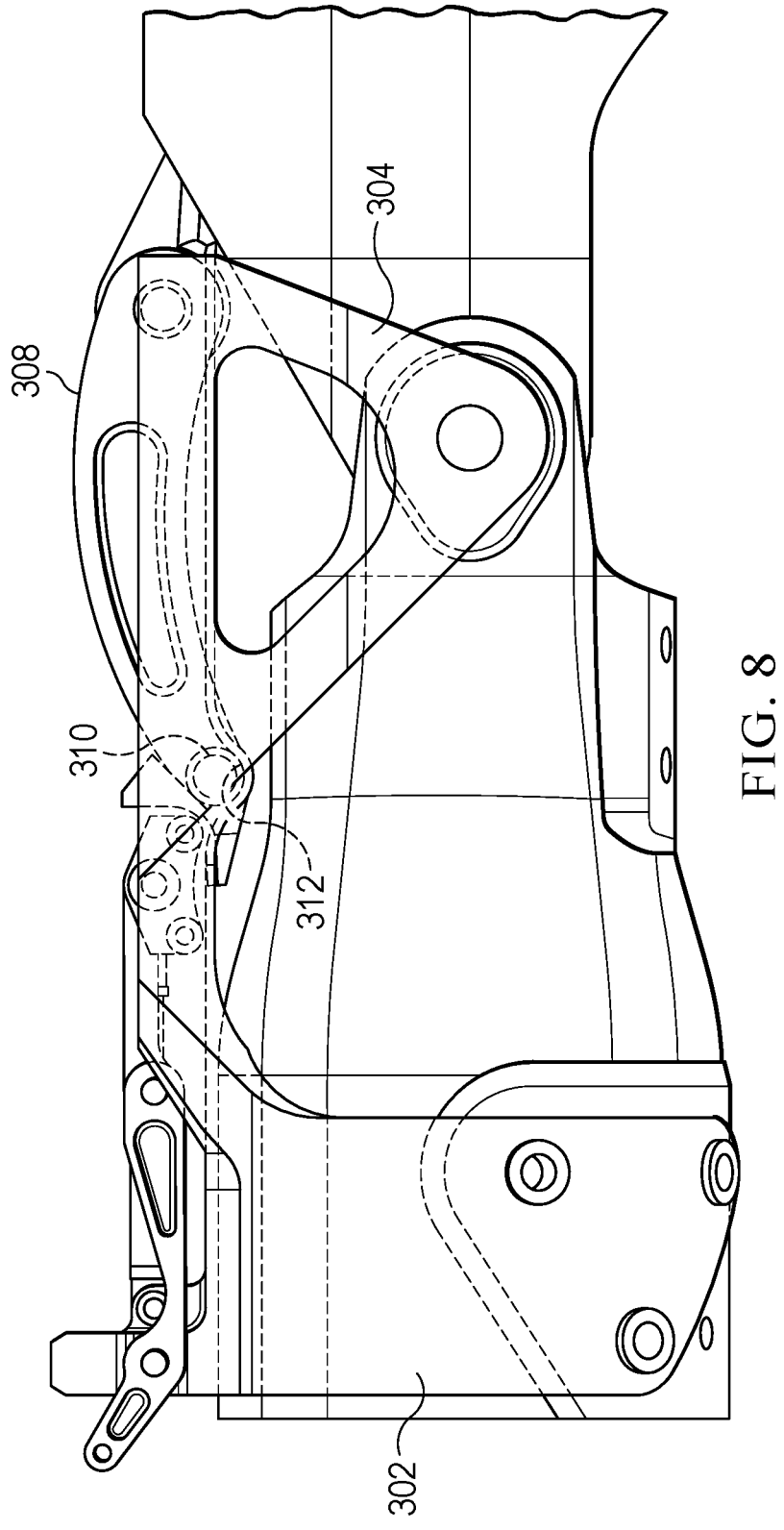
FIG. 8 is a side view of the BPCS of FIG. 7 in a disengaged state.
Figure 9:
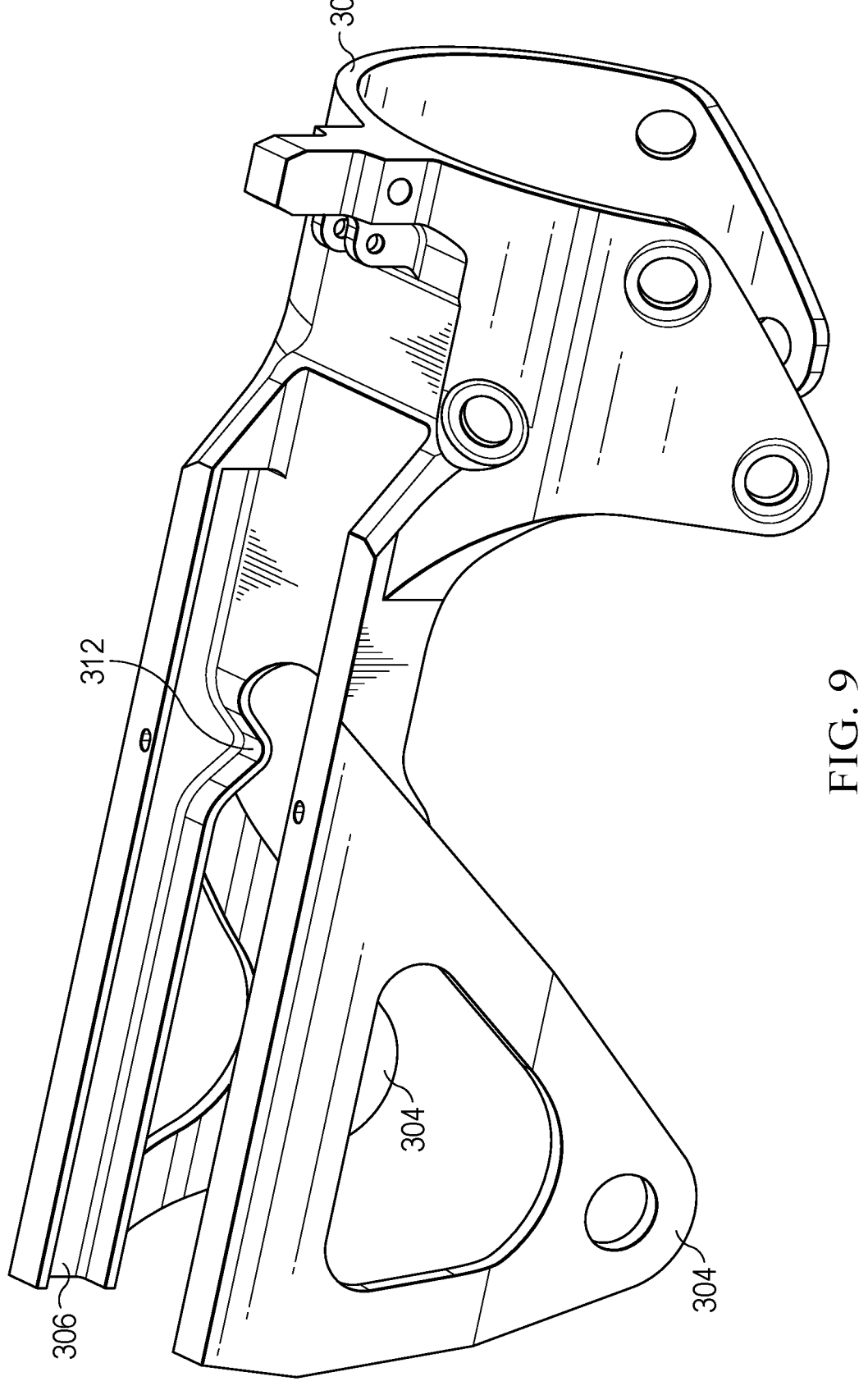
FIG. 9 is an oblique view of a cuff of the BPCS of FIG. 7.
Figure 10:
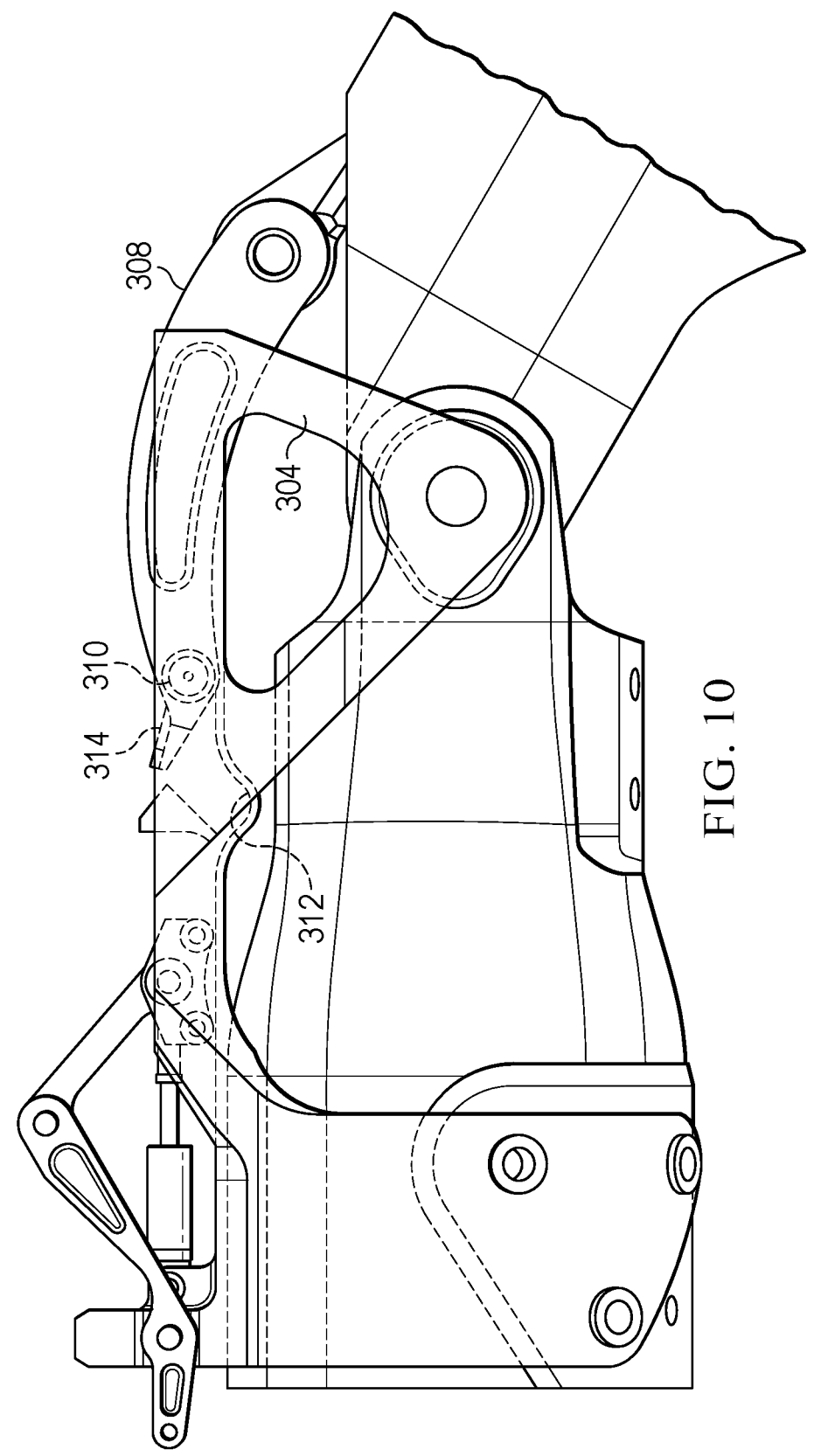
FIG. 10 is a side view of the BPCS of FIG. 7 in an engaged state.
Figure 11:
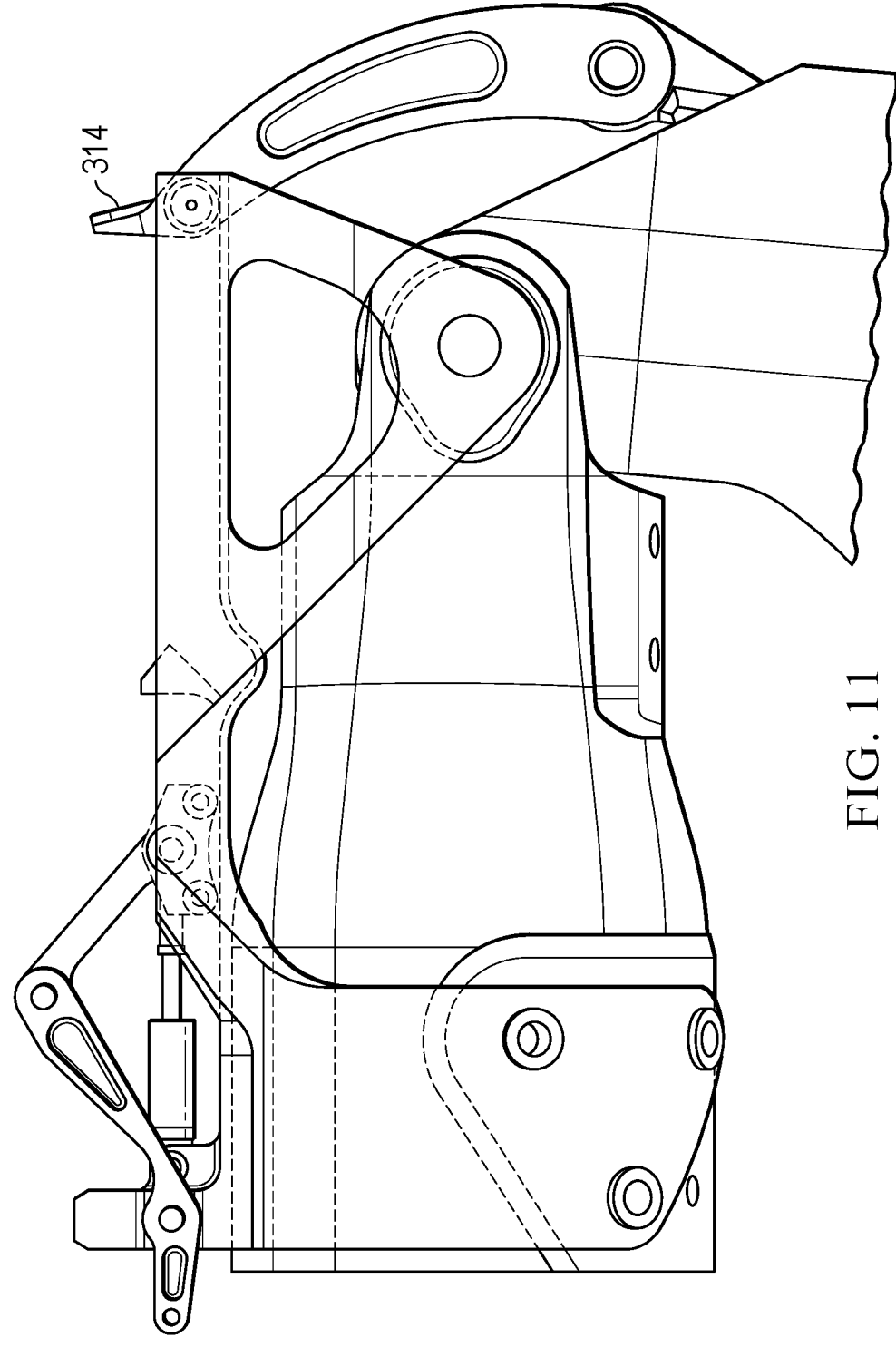
FIG. 11 is a side view of the BPCS of FIG. 7 in another engaged state.

Referring now to FIGS. 7-11, another embodiment of a BPCS 300 is shown. BPCS 300 is substantially similar to BPCS 200, but differs by comprising a different cuff 302 (see FIG. 8) associated with the blade. As compared to cuff 224, cuff 302 comprises extended outboard stiffener flanges 304 that comprise extended outboard tracks 306. BPCS 300 further comprises a drag brace 308 that is rotatably pinned to the folding portion of the blade on the outboard end and is slidably captured within the tracks 306 using slider rollers 310. Tracks 306 comprise a nonlinear path that includes a seating pocket 312 that accepts slider rollers 310 when the blade is in the extended position. When the slider rollers 310 are positioned in the seating pocket 312 portion of the tracks 306, the force required to move the slider rollers 310 outboard from the seating pocket 312 is generally higher than the force required for the slider rollers 310 to move along the straight portions of tracks 306. Accordingly, the seating pocket 312 can be used to more securely maintain the blade in the extended position. Further, drag brace 308 carries an inboard pad 314 that is selectively acted against by rollers 238 to selectively keep slider rollers 310 in the seating pocket 312 portion of tracks 306. As compared to BPCS 200, BPCS 300 can offer different reactionary stiffening by relying more on shear strength as compared to bending in the chordwise direction. Most generally, FIG. 8 shows BPCS 300 in a state where the blade is secured by BPCS 300 in the extended position, FIG. 10 shows BPCS 300 in a state where the blade is released from the extended position and is slightly folded, and FIG. 11 shows BPCS 300 in a state where the blade is nearly completely folded and the slider rollers 310 are near the outboard end of tracks 306.

It will be appreciated that in alternative embodiments, a BPCS can comprise a multilobe component with arms capable of moving receivers of the arms away from and toward a mast axis to achieve the desired selective locking/unlocking functionality. More specifically, in some alternative embodiments, a receiver substantially similar to receiver 216 can be carried by a hinged portion of an arm so that the receiver can be selectively moved along an arc path to selectively receive a component within an aperture of the receiver. In other alternative embodiments, arms of a multilobe component can comprise extendable portions carrying a receiver and the extendable portions can be extended and retracted radially for selective engagement between the receivers and an associated component. In yet other alternative embodiments of a multilobe component, it is contemplated that selective engagement of a receiver of an arm can be accomplished through rotation of the multilobe component about the mast axis and that an accompanying rotational lockout feature can be used to selectively restrict the rotation about the mast axis.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A blade position control system (BPCS), comprising:
an actuator;
a multilobe component configured for at least one of longitudinal movement along a mast axis as a function of actuation of the actuator and rotational movement relative to the mast axis as a function of actuation of the actuator;
wherein movement of the multilobe component selectively restricts folding of a plurality of rotor blades; and
wherein the actuator is disposed relatively more outboard along the mast axis as compared to the multilobe component.

2. The BPCS of claim 1, wherein the multilobe component comprises a plurality of radially extending arms and each arm carries a receiver comprising an aperture associated with selectively restricting pitch movement of the plurality of rotor blades.

3. The BPCS of claim 1, wherein the multilobe component comprises a plurality of radially extending arms and each arm carries a hook guide associated with selectively restricting folding of the plurality of rotor blades.

4. The BPCS of claim 1, wherein the multilobe component comprises a plurality of radially extending arms and each arm carries a receiver comprising an aperture associated with selectively restricting pitch movement of the plurality of rotor blades and wherein the each arm carries a hook guide associated with selectively restricting folding of the plurality of rotor blades.

5. The BPCS of claim 4, wherein the hooks are at least partially disposed relatively more radially inward as compared to the associated apertures or wherein the hooks are capable of pivoting or translating.

6. The BPCS of claim 4, further comprising:
a blade cuff configured for interaction with the multilobe component.

7. The BPCS of claim 6, wherein the blade cuff comprises a pitch lock tab configured to be selectively received within the aperture of the receiver.

8. The BPCS of claim 6, wherein the blade cuff comprises a track associated with selectively restricting folding a blade.

9. The BPCS of claim 8, further comprising:
a slider arm configured to move along the track.

10. The BPCS of claim 9, wherein the slider arm carries a track roller associated with selectively restricting folding a blade.

11. A method, comprising:
providing a foldable rotor blade configured for selectively rotating about a pitch axis;
disposing a multilobe component along a mast axis of a proprotor assembly; and
operating an actuator to move the multilobe component along the mast axis to change a restriction associated with folding the rotor blade;

wherein the actuator is disposed relatively more outboard along the mast axis as compared to the multilobe component.

12. The method of claim 11, wherein the multilobe component is moved by a single actuator and the movement affects pitch axis movement of multiple rotor blades.

13. The method of claim 11, wherein the multilobe component is moved by a single actuator and the movement affects the ability of multiple rotor blades to fold.

14. The method of claim 11, wherein movement of the multilobe component first locks the rotor blade about the pitch axis and secondly allows folding of the rotor blade.

15. The method of claim 11, wherein movement of the multilobe component first locks the rotor blade in an extended position and second unlocks the rotor blade about the pitch axis.

16. An aircraft, comprising:
a blade position control system (BPCS), comprising:
an actuator;
a multilobe component configured for at least one of longitudinal movement along a mast axis as a function of actuation of the actuator and rotational movement relative to the mast axis as a function of actuation of the actuator;
wherein movement of the multilobe component selectively restricts folding of a plurality of rotor blades; and
wherein the actuator is disposed relatively more outboard along the mast axis as compared to the multilobe component.

17. The aircraft of claim 16, wherein the aircraft is a tiltrotor aircraft comprising foldable blades.

\* \* \* \* \*